March 9, 1971  P. E. WIRT ET AL  3,568,493
PIPE BENDING APPARATUS
Filed Feb. 5, 1968  2 Sheets-Sheet 2
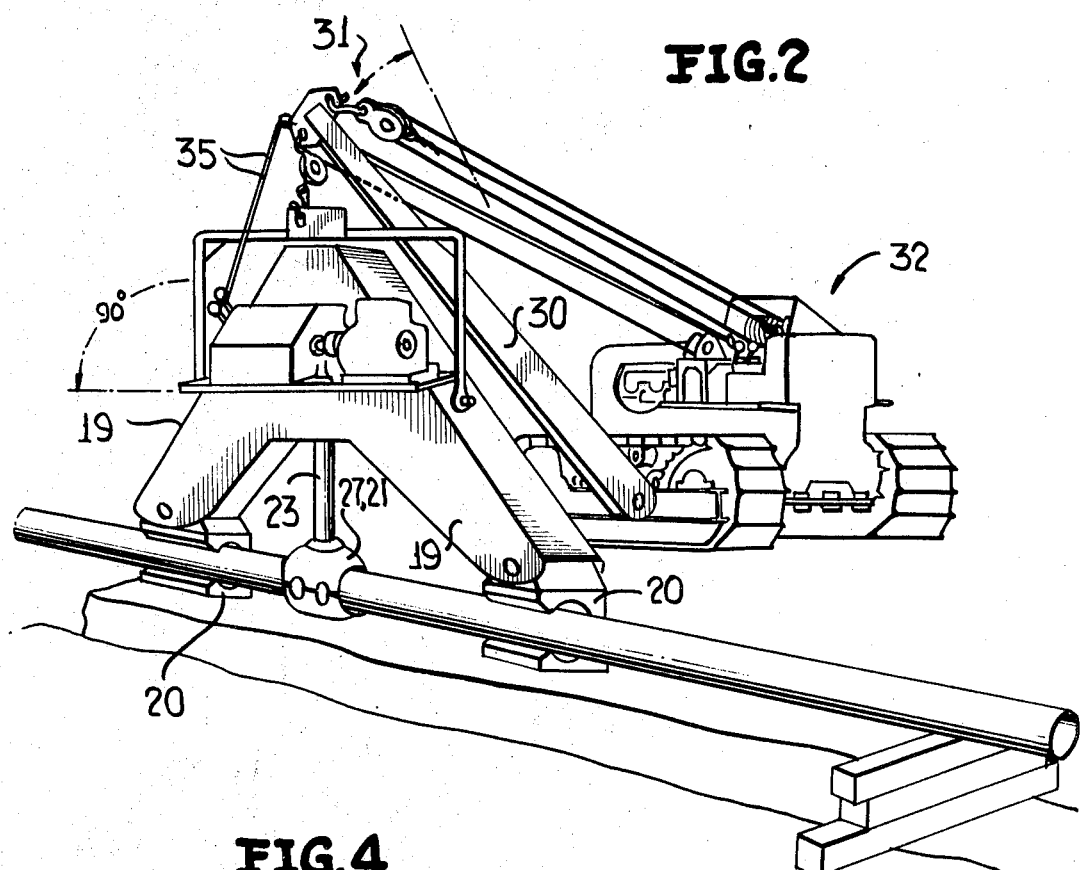
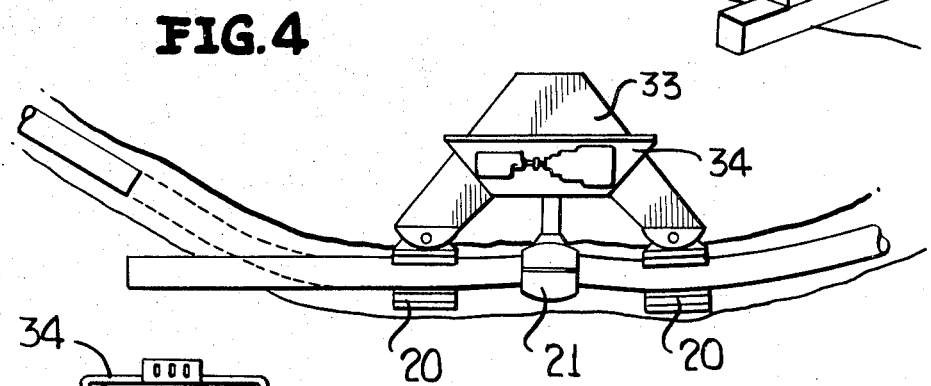
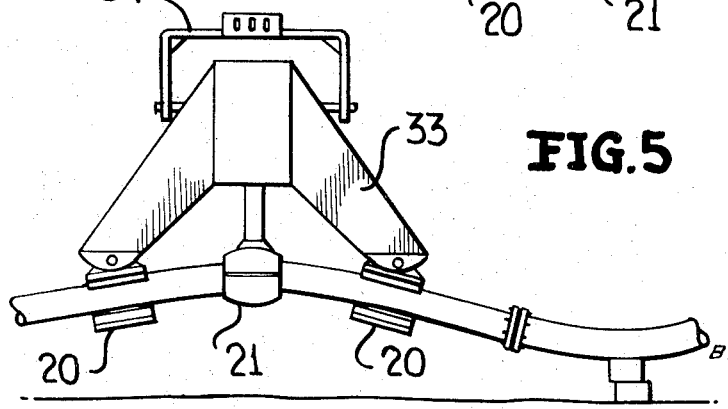
INVENTORS
PAUL E. WIRT
PAUL W. WIRT, DECEASED
BY: WANETA MAXINE WIRT, ADMINISTRATIX
BY
ATTORNEY

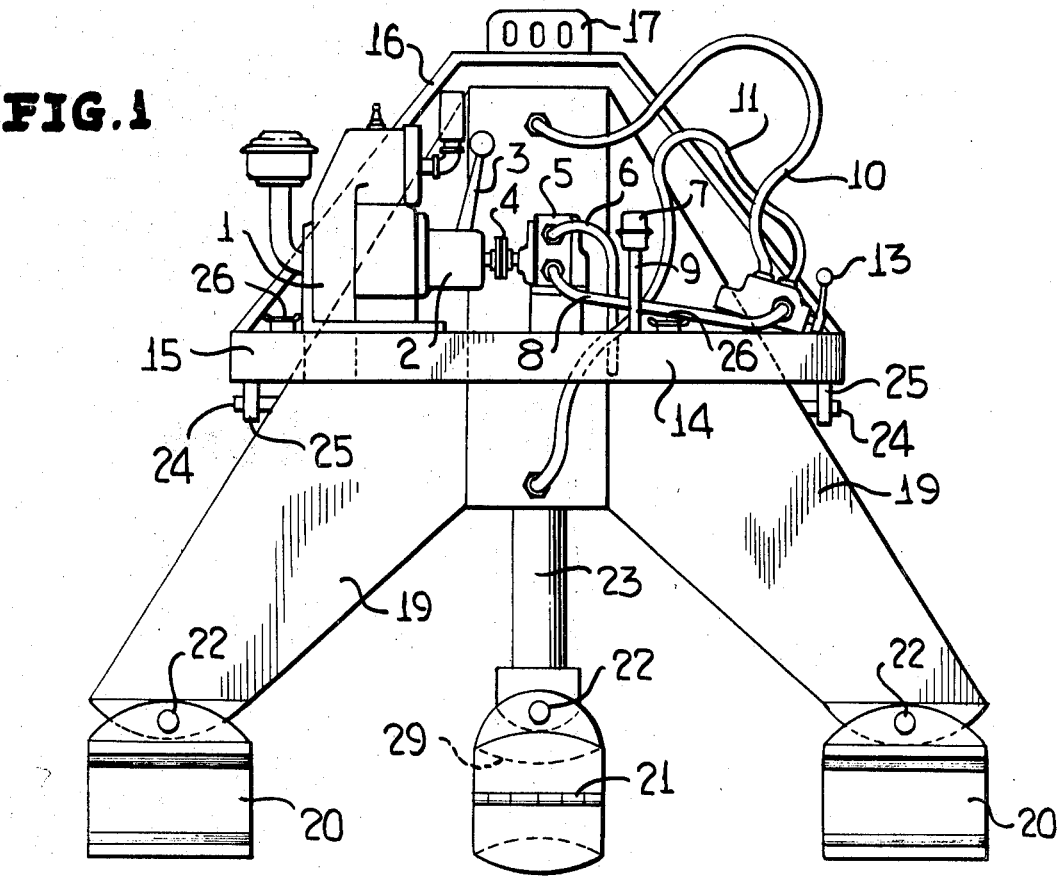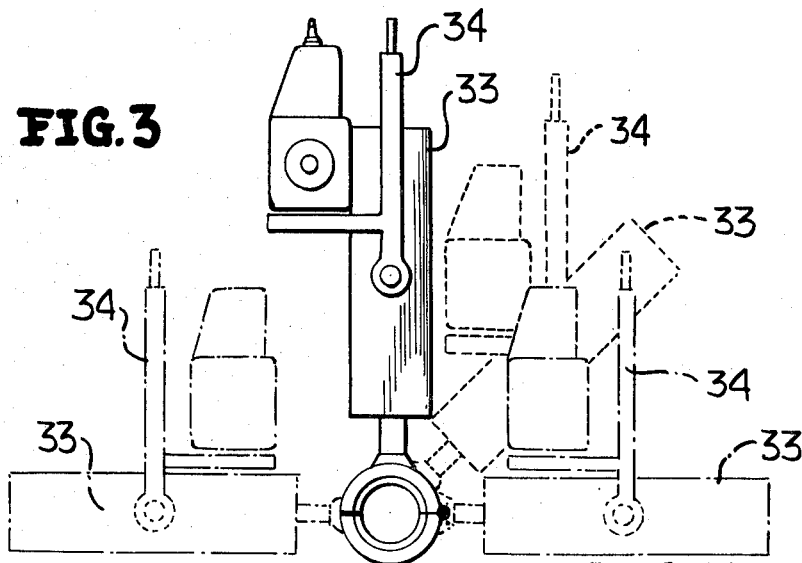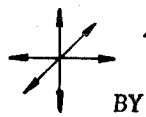

United States Patent Office 3,568,493
Patented Mar. 9, 1971

3,568,493
PIPE BENDING APPARATUS
Paul E. Wirt, R.D. 4, Wooster, Ohio 44691; Paul W. Wirt, deceased, late of Wooster, Ohio, by Waneta Maxine Wirt, administratrix
Filed Feb. 5, 1968, Ser. No. 704,213
Int. Cl. B21d 7/00
U.S. Cl. 72—389                           3 Claims

ABSTRACT OF THE DISCLOSURE

Apparatus for precisely bending pipe, ranging from short lengths to substantial lengths in a complete welded line, in accordance with a desired curvature and in any selected plane from the vertical to the horizontal, wherein a pair of shoes normally lying along the same longitudinal axis and fixedly spaced therealong are pivotally secured to a support member, for holding the pipe while permitting sufficient angular freedom thereof that forces exerted in a direction substantially normal to the pipe axis will produce the desired bend. The forces are exerted by the movement of a fluid-actuated piston, either hydraulic or pneumatic, interposed between the pair of shoes and having a third shoe pivotally secured to the free end thereof for at least partially encompassing the pipe and transmitting the forces to the wall of the pipe over a sufficiently large area to prevent rupture or buckling.

BACKGROUND OF THE INVENTION

The present invention relates generally to apparatus for applying transverse forces to pipe to change the radius of curvature thereof, and in particular to pipe bending machines wherein a fluid pressure-actuated piston is employed to transmit bending forces in a direction normal to the pipe axis while the pipe is pivotally secured at either side of the point of application of the resultant force vector.

In the past a number of methods have been proposed to facilitate the bending of pipe ranging in size from thin-walled tubing to large diameter thick-walled iron and steel pipe used in pipelines for supporting fluid flow over relatively great distances. In general, the methods applicable to the bending of thin-walled tubes or small diameter pipes such as are used in commercial or residential plumbing arrangements are unsuitable for the bending of pipes of the size normally required for municipal water or sewage lines or for long distance natural gas or oil lines. For example, the secure retention of one end of a relatively short length of pipe while exerting a bending force on the other end to produce conformance with the radius of a semi-cylindrical fixture along which the pipe is initially partly supported has proven quite successful for small diameter pipes, yet is not feasible for the bending of large diameter heavy pipe.

A major problem occurs where the path of the pipeline has been selected and the ditches dug, if the pipe is to be laid underground, or the support members provided, if an above-ground pipeline is desired, and substantial lengths of the heavy pipe must then be bent to conform to that path. Problems of even greater severity occur where the path of a "solid" pipeline, e.g., a completely welded line, must be changed. Frequently, too, the short lengths of pipe have been bent when stacked prior to use, as the result of rough handling, and require straightening before they can be inserted into the line.

All such cases require the changing of the radius of curvature of the pipe by appropriate application of forces thereto. As used throughout this specification and its appended claims, the terminology "radius of curvature" is intended to include a curvature having an infinite radius, that is to say, a straight line. Accordingly, the changing of the radius of curvature of the pipe includes bending of pipe of relatively straight length, and straightening of pipe that has been intentionally or inadvertently bent.

In attempting to solve the aforementioned problems it is essential that the bending operation be performed in such a manner that the pipe is not subjected to the point or lineal application of a force or forces of large magnitude about its longitudinal axis, as could produce buckling and or rupture of the pipe wall. Moreover, it is frequently necessary that overbends (i.e., vertically upward bends), sag bends (i.e., vertically downward bends), side bends (i.e., horizontal bends), or similar bends or any combination thereof be made at sections of a complete or substantial length of pipeline. This means that apparatus capable of bending heavy pipe of the type under discussion be sufficiently maneuverable to permit rapid variation of orientation to effect the desired bends in minimal time and with minimal use of manpower or expenditure of energy from other sources.

Accordingly, it is a principal object of the present invention to provide improved apparatus for rapidly varying the radius of curvature of short or substantial lengths of large diameter heavy pipe.

SUMMARY OF THE INVENTION

Briefly, pipe bending apparatus in accordance with the present invention consists of five basic items, viz., a source of control fluid under high pressure; a bifurcated frame; clamping members or shoes pivotally coupled to the respective extremities of the branches of the bifurcated frame for retaining at least a portion of the length of pipe to be bent, at two spaced-apart distinct places, while permitting some angular freedom at each retention point relative to the longitudinal axis along which the clamping members are normally disposed; a reciprocable member projecting from the bridging portion of the frame and having means for at least partially encompassing a section of the pipe intermediate the two spaced-apart retention points, and selectively actuable in response to operation of the high pressure control fluid source to exert a distributed force on the pipe nominally perpendicular to its axis along the aforesaid intermediate section, whereby to vary the radius of curvature of the pipe without concentrating the bending force at a point or a peripheral line as might produce buckling of the pipe wall; and a structural unit pivotally coupled to the frame along the bridging portion thereof to swivel through a quadrant relative to the plane of the frame, for supporting the control fluid source in a relatively horizontal position while the plane of the frame is disposed within the plane in which the desired bend is to be formed.

In accordance with an important feature of the invention, the structural unit is constructed and adapted to be conveniently lifted by the boom of any of a variety of machines normally located at the site of a pipeline construction operation. Such machines may include a crane, a tractor (including bulldozers or other earth-moving machines), a power shovel, or may be especially adapted for use solely with the pipe bending apparatus. Block and tackle, pulleys, or other conventional devices are used to raise and lower the boom, and thereby, the pipe bending apparatus. When the shoes or clamping members of the apparatus are coupled to the pipe, the raising or lowering of the boom is accompanied by a swiveling of the frame from an upright (i.e., vertical plane) position to horizontal position. Accordingly, the angle at which the plane of the frame is positioned relative to the earth's surface may be selected in accordance with the desired plane of the pipe bend while the pipe is actually in the complete line or a substantial length of line. That is to say, with apparatus of the present invention there is no need to preform (bend) short sections of pipe before a long section of the pipeline may be assembled; rather, bending may be accomplished at pipe section in situ in the line. Moreover, the upright frame position will accommodate bending of pipe lying in a narrow trench or ditch. Any convenient and conventional linkages may be used to permit selective operation of the control fluid source to actuate the reciprocable member of the pipe bender from the cab or operator's seat of the power machine.

BRIEF DESCRIPTION OF THE DRAWINGS

The above and other objects, features and advantages of my invention will be more fully comprehended by reference to the following detailed description of a preferred, but non-limiting, embodiment thereof, considered together with the accompanying drawings, in which:

FIG. 1 is a front elevational view of the pipe bending apparatus in an upright position;

FIG. 2 is a perspective view of the pipe bending apparatus of FIG. 1 maintained in position by and controlled from a power machine;

FIG. 3 is a simplified end view of the pipe bending apparatus of the preceding figures, illustrating, partly in phantom, the manner in which the frame may assume a position in the plane of any desired bend; and FIGS. 4 and 5 are simplified mechanical schematic diagrams showing the pipe bending apparatus in use for side bends and overbends.

DESCRIPTION OF THE PREFERRED EMBODIMENT

Referring initially to FIG. 1, and with concurrent reference to other figures from time to time as indicated, the basic pipe bending apparatus includes a source of control fluid under high pressure. Within the contemplation and scope of this terminology, at least insofar as my preferred embodiment is concerned, is a power source 1, such as the gasoline-powered engine shown or a battery-powered engine motor, for supplying driving force to a pump 5; the pump withdrawing fluid such as oil from a reservoir or tank 14 via a flexible conduit or hoseline 6 in response to engagement of the clutch members or plates 4 upon actuation of a conventional reciprocable mechanism 2 by a clutch lever 3; supply hoses and control valves, including a hose 8 for supporting the flow of fluid under high pressure to a valve 12 operable in response to movement of control lever 13 to route highly pressurized fluid to hose 10 or to hose 11; and a cylinder 18 for receiving the high pressure fluid from supply hose 10 or 11 according to the desired direction of movement of a piston 23, to be discussed in greater detail presently. Fluid reservoir 14 is vented to the atmosphere by a filler pipe 9 having vented removable cap 7. The filler pipe should be sufficiently long to permit inclination of that portion of the apparatus constituting the control fluid source, without spillage of the contents of reservoir 14. For the illustrated gasoline engine 1, a fuel tank 15 is provided from which gasoline may be siphoned into the combustion chamber, the tank having a filler cap 26. In the preferred embodiment, both the gas tank 15 and the oil reservoir 14 are compartments in the floor of the structural unit employed to support several of the control fluid source elements. This, however, is not essential, containers of other shapes and sizes obviously being within the contemplation of my invention.

Moreover, it is to be emphasized that the control system may be pneumatic or hydraulic; and that although a fluid operated control system to institute bending is preferred, other systems or mechanisms by which to produce selective reciprocation of a piston or other force applying member capable of moving forward or backward, may be utilized, if desired.

The pipe bending apparatus also includes the previously mentioned structural unit, which comprises the compartmented floor primarily for supporting power source 1 and pump 4; a hinge arrangement utilizing brackets 25 fastened to the underside of the floor, and pins 24 projecting from a part of the apparatus to be described, to permit the structural unit (also referred to as the power supply support means) to pivot or swivel relative to the remainder of the apparatus; and a carriage bracket 16 of welded or bent channel members or other rigid beams, having the general shape of an inverted U or V with its arms fastened to a substantial portion of respective opposite edges of the floor, and having an apertured flange 17 at is uppermost portion to permit insertion of a hook, cable, or other element for lifting the entire apparatus.

The pipe bending apparatus further includes a relatively narrow (i.e., edgewise) bifurcated frame having branches 19 bridged or joined by the cylinder 18 or by a structural member supporting the cylinder. In any event, cylinder 18 is generally disposed in the plane of the frame to permit reciprocation of piston 23 in that plane.

Attached to the extremities of branches 19 by coupling members 22 such as hinge pins and associated brackets to permit pivoting in the plane of the frame, are a pair of clamping members 20 which are employed to encompass or partially encompass the pipe at spaced-apart areas thereof. The clamping members, or shoes, may be of an open type, as shown, or of a closed type (see, e.g., item 21 of FIG. 2), and in either event are preferably releasably hinged or sectioned to permit jawlike operation for lengthwise insertion or removal of the pipe section to be bent.

An open or closed type of shoe 21 is also provided at the extremity of piston 23, and is fastened thereto by another pivotal coupling member 22; such that, like shoes 20, it may be skewed or inclined relative to the common longitudinal axis of the three shoes within the plane of the frame. The longitudinal axis of the shoes is, of course, coincident with the longitudinal axis of a straight length of pipe inserted therein, but the pipe, and hence its axis, may thereafter be bent to assume a radius of curvature comforming to the desired path of the pipeline, whereas the common axis of the shoes remains unchanged. It is only the angle of the individual axis of each shoe relative to the common axis of all of the shoes that can change, and this is only of a temporary nature, the dynamic center of balance of each shoe being such that the shoe returns to the position shown in FIG. 1 after the pipe is removed.

Preferably the inner surface of each of clamping members 20 and 21 is tapered or flared in a continuous curve from a minimum dimension at its center to a maximum dimension at its ends, and is covered with a flexible or resilient material 29 to prevent flattening or buckling of the pipe at the region of clamping. In addition, each shoe, which may be replaceable with a shoe of different dimensions to accept a different size of pipe, is sufficiently oversize relative to the pipe diameter to permit the pipe to rotate therein about the longitudinal axis as the plane of the frame is varied in accordance with the desired plane of the bend.

The extent or degree of bend (as contrasted with the plane of the bend) is determined by the force transmitted by piston 23 as it moves outwardly or inwardly of cylinder 18 under the control of lever 13. Outward movement of the piston is effected, with the engine 1 running and the clutch plates 4 engaged, by applying fluid under pressure to hose 10, whereas inward movement of the piston is achieved by application of the pressurized fluid to hose 11. Piston and cylinder operation per se is of course completely conventional and does not, therefore, require any detailed analysis here.

It should be observed that the force applied to or exerted on the pipe is nominally directed normal to the longitudinal axis of the pipe, intermediate the points of clamping or retention defined by shoes 20, but is distributed over a length of the pipe (determined by the length and degree of flaring of shoe 21) sufficient to prevent buckling or rupture of the pipe wall. Directed still further to this end, the clamping points of the pipe are not rigid, but are permitted to pivot on either side of the region of applied force to permit the pipe to assume the desired radius of curvature without introducing undesirable stresses that can tend to weaken the pipe wall, its seam (if one is present) or joints between lengths of pipe.

Referring now to FIG. 2, pipe bending apparatus of the type generally shown in FIG. 1, with much of the detail omitted for the sake of simplicity and clarity in the present discussion, is shown supported by a boom 30 and block and tackle arrangement 31 operated from a tractor or other power machinery 32. As illustrated in the Figure, the pipe bender is in its upright or vertical position corresponding to that shown in FIG. 1. However, as shown in FIG. 3, the frame 33 may be swiveled relative to the structural unit 34 (which is dynamically balanced to assume a position in which its floor is horizontal relative to the immediately surrounding contour of the earth, whenever the apparatus is lifted on the boom), so as to assume any desired angle of inclination in a quadrant or sector between the horizontal and vertical planes. In such an instance the frame 33 is rotated about the pipe, and the structural unit pivots about hinge pins 24 on the frame.

The upright position of the frame is used for producing over bends (i.e., vertically upward bends) or sag bends (i.e., vertically downward bends) as illustrated in FIG. 5, whereas the horizontal position of the frame is desired for making side bends (i.e., horizontal bends) to fit a ditch and to tie in a curve between two completed sections of pipeline, as illustrated in FIG. 4 where a plan view of the apparatus is shown. Bends in planes between the vertical and the horizontal may be sought where pipe must be laid along a sloping contour while the tractor itself is on level ground.

If desired, all control over the bending operations and the necessary actuation of engine, pump, clutch, etc., may be exercised from the cab or seat of the power machinery by its operator, with the aid of another member of the crew where for one reason or another the section of pipe at which the bend is to be provided is obscured from the operator's view. Conventional linkages, such as are designated by reference numeral 35, may be employed for such remote control.

While I have disclosed a preferred embodiment of my invention, it will be apparent that variations in the specific details of construction that have been illustrated and described may be resorted to by the exercise of ordinary skill without departing from the spirit and scope of the invention, as disclosed in the appended claims.

I claim:
1. Pipe bending apparatus, comprising a frame:
   means having a longitudinal axis normally conforming to that of the pipe, for retaining a section of pipe at two spaced-apart regions along said axis, and pivotally coupled to said frame to permit angular deviations of the axis of said pipe relative to the longitudinal axis of said retaining means, in the area of each of said spaced-apart regions;
   means reciprocably coupled to said frame for imparting a distributed force along a length of the pipe intermediate said spaced-apart regions of retention and in a direction substantially normal to the axis of said pipe to produce a desired bend;
   said pipe assuming at said regions of retention a curve conforming to that required by said bend as a result of the permissive angular deviation thereat;
   means for selectively actuating said force imparting means;
   said frame being rotatable about said pipe on said retaining means to assume a position in which said bend is produced in any desired plane within a sector bounded by the horizontal and vertical planes relative to the earth's surface;
   wherein said frame is bifurcated, and wherein said retaining means comprises a pair of nominally cylindrical shoes pivotally coupled to the extremities of respective branches of said frame, for at least partially encompassing said pipe at said spaced-apart regions;
   wherein said force imparting means includes a shaft and a further nominally cylindrical shoe pivotally coupled to the free end of said shaft for at least partly encompassing said pipe along said intermediate length, said shaft projecting from a point of said frame between said branches; and
   wherein said shaft is a piston; and wherein said means for selectively actuating said force imparting means includes a source of control fluid under pressure and a cylinder from which said piston projects for axial movement inwardly and outwardly thereof, and means for applying said control fluid to said cylinder to produce either inward or outward movement of said piston according to the desired direction of bend to be produced.

2. The invention according to claim 1, further including a structural unit for supporting said source of control fluid under pressure in a substantially horizontal plane with respect to the earth's surface irrespective of the position of said frame within said sector, said structural unit being hinged to said frame to swivel relative thereto, and including a carriage bracket by which said apparatus may be lifted and freely supported.

3. The invention according to claim 1 wherein each of said shoes is provided with a layer of flexible material on its internal surface, on which the periphery of the pipe is to be supported.

References Cited

UNITED STATES PATENTS

| | | | |
|---|---|---|---|
| 2,694,434 | 11/1954 | Petty | 72—380 |
| 2,708,471 | 5/1955 | Ballard | 72—380 |
| 2,998,838 | 9/1961 | Byrd | 72—389 |
| 3,021,886 | 2/1962 | Ferris | 72—389 |
| 3,124,192 | 3/1964 | Williams | 72—389 |
| 3,344,635 | 10/1967 | Van Allen | 72—389 |

FOREIGN PATENTS

| | | | |
|---|---|---|---|
| 516,924 | 1/1953 | Belgium | 72—389 |

CHARLES W. LANHAM, Primary Examiner

G. P. CROSBY, Assistant Examiner